United States Patent
Bassett-audain et al.

(10) Patent No.: US 11,635,796 B2
(45) Date of Patent: Apr. 25, 2023

(54) POWER GRID LATERAL TROUBLE TICKET CAUSE DETERMINATION AND TICKET MANAGEMENT

(71) Applicant: Florida Power & Light Company, Juno Beach, FL (US)

(72) Inventors: Lucas Bassett-audain, Jupiter, FL (US); Genese Augustin, Fort Lauderdal, FL (US); Daniel Barbosa, Palm Beach Gardens, FL (US); Steven Tolbert, Boca Raton, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 164 days.

(21) Appl. No.: 17/191,277

(22) Filed: Mar. 3, 2021

(65) Prior Publication Data

US 2022/0283618 A1   Sep. 8, 2022

(51) Int. Cl.
   *G05B 15/02*     (2006.01)
   *G06F 1/28*     (2006.01)
   *G05B 19/4067*     (2006.01)

(52) U.S. Cl.
   CPC .............. *G06F 1/28* (2013.01); *G05B 15/02* (2013.01); *G05B 19/4067* (2013.01)

(58) Field of Classification Search
   CPC ........ G06F 1/28; G05B 15/02; G05B 19/4067
   See application file for complete search history.

(56) References Cited

U.S. PATENT DOCUMENTS

| | | | |
|---|---|---|---|
| 2011/0119517 A1* | 5/2011 | Beeco | H04L 41/12 713/340 |
| 2012/0200426 A1 | 8/2012 | Diluciano et al. | |
| 2013/0166641 A1* | 6/2013 | Kan | H02J 13/00006 709/204 |
| 2013/0241746 A1* | 9/2013 | McKinley | G01R 29/18 340/870.02 |

(Continued)

OTHER PUBLICATIONS

Short, "Advanced Metering for Phase Identification, Transformer Identification, and Secondary Modeling", EPRI, Burnt Hills, NY, 12027 USA.

(Continued)

*Primary Examiner* — Gary Collins
(74) *Attorney, Agent, or Firm* — Tarolli, Sundheim, Covell & Tummino LLP (57) ABSTRACT

A power grid monitoring system for determining a cause of a lateral trouble ticket. The power grid monitoring system can determine a cause of a lateral trouble ticket in response to receiving the lateral trouble ticket. The power grid monitoring system associates a set of smart meters with a first, penultimate and last transformer downstream from a given lateral. The power grid monitoring system pings each smart meter in the set of smart meters to indicate a state of the first, penultimate and last transformers of the given lateral. Accordingly, the power monitoring system determines a cause of a lateral trouble ticket associated with the given lateral based on results of the pings to the set of smart meters associated with the first, last and penultimate transformers. The power grid monitoring system can further augment the lateral trouble ticket with information characterizing the cause of the lateral trouble ticket.

20 Claims, 6 Drawing Sheets

(56) References Cited

U.S. PATENT DOCUMENTS

| | | | |
|---|---|---|---|
| 2018/0210025 A1* | 7/2018 | Schoenman | G01R 31/085 |
| 2018/0267494 A1* | 9/2018 | Meranda | G06Q 10/063114 |
| 2019/0186952 A1* | 6/2019 | Schwartz | H04L 45/22 |

OTHER PUBLICATIONS

Smith, "Electrical Distribution Modeling: An Integration of Engineering Analysis and Geographic Information Systems", Thesis submitted to the Faculty of the Virginia Polytechnic Institute and State University in partial fulfillment of the requirements for the degree of Master of Science in Electrical Engineering, Dec. 15, 2005.

* cited by examiner

POWER GRID LATERAL TROUBLE TICKET CAUSE DETERMINATION AND TICKET MANAGEMENT

TECHNICAL FIELD

The present disclosure relates to systems and methods for determining a cause of a lateral trouble ticket.

BACKGROUND

Electrical power distribution grids can be implemented as radial, loop or network type systems. The distribution grids are arranged and interconnected to a substation in different ways depending on the type of system configuration. However, for each type of distribution system configuration, the distribution circuits (commonly referred to as feeders and lateral feeders) distribute power delivered from a substation to loads at premises coupled to the grid through smart meters.

A smart meter is an electronic device that records consumption of electric energy in intervals of an hour or less and communicates that information at least daily back to a utility provider for monitoring and billing. Smart meters enable two-way communication between the meter and the utility provider. Unlike home energy monitors, smart meters can gather data for remote reporting.

An issue tracking system (also ITS, trouble ticket system, support ticket, request management or incident ticket system) is a computer software package that manages and maintains lists of issues. Issue tracking systems are used in collaborative settings, but can also be employed by individuals as part of a time management or personal productivity regime. These systems often encompass resource allocation, time accounting, priority management, and oversight workflow in addition to implementing a centralized issue registry.

SUMMARY

One example relates to a power grid monitoring system operating on a computing platform. The power grid monitoring system includes a transformer management engine that can associate a first smart meter of a set of smart meters with a first transformer downstream from a given lateral, a penultimate smart meter of the set of smart meters with a penultimate transformer downstream from the given lateral and a last smart meter of the set of smart meters with a last transformer downstream from the given lateral. Accordingly, the transformer management engine can ping each smart meter in the set of smart meters to indicate a state of the first transformer, the penultimate transformer and the last transformer of the given lateral. The power grid monitoring system further includes an event processing engine that determines a cause of a lateral trouble ticket associated with the given lateral based on results of the pings to the set of smart meters associated with the first, last and penultimate transformers. If results of the pings to the set of selected smart meters indicate that the first transformer is online and that the last and penultimate transformers are offline, the event processing engine can determine that the cause of the lateral trouble ticket is a wire down. Additionally, if the results of the pings to the set of selected smart meters indicate that the first, last and penultimate transformer are offline, the event processing engine can determine that the cause of the lateral trouble ticket is blown fuse. Moreover, the power grid monitoring system can include a ticket management engine that augments the lateral trouble ticket with information characterizing the cause of the lateral trouble ticket.

Another example relates to a non-transitory machine readable medium having machine executable instructions. The medium includes a notification engine configured to receive a lateral trouble ticket in response to a ticket management engine elevating a given trouble ticket to the lateral trouble ticket. The medium further includes a database that stores geographic and information system (GIS) data that is employed to generate a lateral grid topology for a plurality of transformers downstream from the given lateral. Furthermore, the medium includes a transformer management engine that associates a first smart meter of a set of smart meters with a first transformer downstream from a given lateral, associates a penultimate smart meter of the set of smart meters with a penultimate transformer downstream from the given lateral and associates a last smart meter of the set of smart meters with a last transformer downstream from the given lateral. The transformer management engine is further configured to ping each smart meter in the set of smart meters to indicate a state of the first transformer, the penultimate transformer and the last transformer of the given lateral. The medium further includes an event processing engine that determines a cause of the lateral trouble ticket based on results of the pings to the set of smart meters associated with the first, last and penultimate transformers of the lateral grid topology. If the results of the pings to the set of selected smart meters indicate that the first transformer is online and that the last and penultimate transformers are offline, the event processing engine can determine that the cause of the lateral trouble ticket is a wire down. Additionally, if the results of the pings to the set of selected smart meters indicate that the first, last and penultimate transformer are offline, the event processing engine can determine that the cause of the lateral trouble ticket is blown fuse. Moreover, the medium includes a ticket management engine that augments the lateral trouble ticket with information characterizing the cause of the lateral trouble ticket.

Yet another example relates to a method for monitoring a power grid. The method includes receiving, by a notification engine, a lateral trouble ticket in response to a ticket management engine elevating a given trouble ticket to a lateral trouble ticket. The method further includes generating, by a grid topology engine, a lateral grid topology. Moreover, the method includes associating, by a transformer management engine, a first smart meter of a set of smart meters with a first transformer downstream from a given lateral, associating a penultimate smart meter of the set of smart meters with a penultimate transformer downstream from the given lateral and associating a last smart meter of the set of smart meters with a last transformer downstream from the given lateral. The transformer management engine also provides a request to a smart meter management engine to ping each smart meter in the set of smart meters to indicate a state of the first transformer, the penultimate transformer and the last transformer of the given lateral. The method further includes determining, by an event processing engine, a cause of the lateral trouble ticket based on results of the pings to the set of smart meters associated with the first, last and penultimate transformers of the lateral grid topology. If the results of the pings to the set of selected smart meters indicate that the first transformer is online and that the last and penultimate transformers are offline, the event processing engine can determine that cause of the lateral trouble ticket is a wire down. Additionally, if the results of the pings to the set of selected smart meters indicate that the first, last and penultimate transformer are offline, the event processing engine can determine that cause of the lateral trouble ticket is blown fuse. Furthermore, the method includes augmenting, by the ticket management engine, the lateral trouble ticket with information characterizing the cause of the lateral trouble ticket.

DETAILED DESCRIPTION

This disclosure relates to a power grid monitoring system executing on a utility server that can automatically determine a cause for a lateral trouble ticket for a given lateral. In response to reports of an outage from customers associated with transformers that are downstream from the given lateral, the lateral trouble ticket can be generated for the given lateral. In response to generation of the lateral trouble ticket, the power grid monitoring system can generate a lateral grid topology using location data provided by a geographic information system (GIS). The lateral grid topology can accurately determine relationships between each of the transformers downstream from the given lateral. Thus, the power grid monitoring system can employ the lateral grid topology to select and associate a set of smart meters downstream from the first, penultimate and last transformers downstream from the given lateral. Accordingly, the power grid monitoring system can determine a likely cause for the lateral trouble ticket based on results of pings to the selected set of smart meters.

The power grid monitoring system of the present disclosure eliminates the need for an investigate crew by automatically determining the cause of a lateral trouble ticket (e.g., a wire down or a blown fuse) and augmenting the lateral trouble ticket to indicate the cause of the lateral trouble ticket, such that the appropriate service crew (e.g., a service crew capable of servicing a wire down or a service crew capable of replacing a blown fuse) can be deployed. Rather than deploying an investigative service crew, the power grid monitoring system pings a set of selected smart meters associated with a first, penultimate and last transformer downstream from the given lateral associated with the lateral trouble ticket. By examining the results of the pings, the power grid monitoring system can determine a state of the first, penultimate and last transformer downstream from the given lateral based on the results of the pings to the set of selected smart meters. That is, the state of a given transformer can be online, such that the given transformer is energized and providing voltage to downstream electrical components. Moreover, the state of a transformer can be offline, such that the transformer is not energized and is not providing voltage to downstream electrical components. Thus, the power grid monitoring system can determine the cause of the lateral trouble ticket based the state of the first, penultimate and last transformer downstream from the given lateral and augment the lateral trouble ticket deploy the appropriate service crew.

Figure 1:
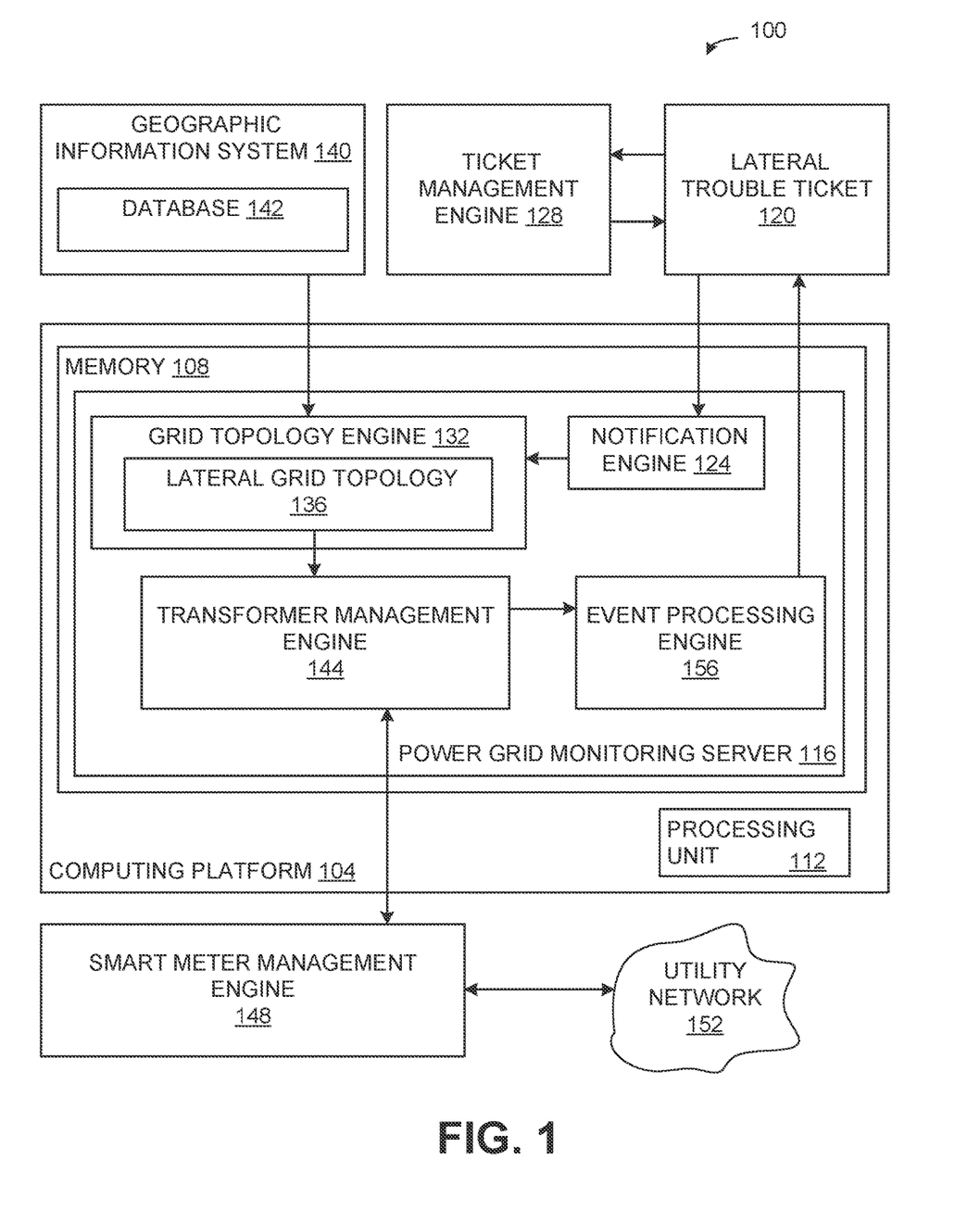
FIG. 1 illustrates an example of a power grid monitoring system configured to process lateral trouble tickets.

FIG. 1 illustrates an example of a power grid monitoring system 100 configured to determine a cause for trouble tickets. Communication between nodes of the power grid monitoring system 100 can be conducted via a private network (e.g., a wireless carrier network), a public network (e.g., the Internet), or a combination thereof.

The power grid monitoring system 100 can include a computing platform 104. Accordingly, the computing platform 104 can include a memory 108 for storing machined readable instructions and data and a processing unit 112 for accessing the memory 108 and executing the machine-readable instructions. The memory 108 represents a non-transitory machine-readable memory (or other medium), such as random access memory (RAM), a solid state drive, a hard disk drive or a combination thereof. The processing unit 112 can be implemented as one or more processor cores. The computing platform 104 can include a network interface (not shown), such as a network interface card configured to communicate with other nodes of the power grid monitoring system 100.

The computing platform 104 could be implemented in a computing cloud. In such a situation, features of the computing platform 104, such as the processing unit 112, the network interface, and the memory 108 could be representative of a single instance of hardware or multiple instances of hardware with applications executing across the multiple of instances (e.g., distributed) of hardware (e.g., computers, routers, memory, processors, or a combination thereof). Alternatively, the computing platform 104 could be implemented on a single dedicated server or workstation. Furthermore, in some examples the computing platform 104 can be employed to implement other nodes of the power grid monitoring system 100 in a similar manner. However, for purposes of simplification of explanation, only the details of the computing platform 104 are illustrated.

The memory 108 can include a power grid monitoring server 116. The power grid monitoring server 116 can be configured/programmed to automatically determine a cause for received lateral trouble ticket 120. The power grid monitoring server 116 can automatically determine the cause for received lateral trouble ticket 120 in real time, such that a received lateral trouble ticket 120 can be processed in relatively quickly (e.g., two minutes or less). In response to automatically determining the cause for the received lateral trouble ticket 120, the power grid monitoring server 116 can automatically augment the received lateral trouble ticket 120 in a manner that is more timely than deploying an investigative service crew to determine the cause of the lateral trouble ticket 120. Moreover, the lateral trouble ticket 120 can uniquely identify a given lateral, as well as transformers that are downstream from the given lateral. Furthermore, the lateral trouble ticket 120 can indicate issues reported with the given lateral and/or transformers downstream from the given lateral (e.g., a customer requesting power restoration).

The power grid monitoring server 116 can include modules that execute specific operations to assist with these tasks. More particularly, the power grid monitoring server 116 can include a notification engine 124. The notification engine 124 can receive a lateral trouble ticket 120 from a ticket management engine 128 in response to a transformer trouble ticket being escalated to a lateral trouble ticket 120 by the ticket management engine 128. In particular, a transformer trouble ticket can be escalated to a lateral trouble ticket 120 by the ticket management engine 128 when two or more transformer trouble tickets are generated for a lateral associated with the two or more transformer trouble tickets. Alternatively, the ticket management engine 128 can generate a lateral trouble ticket 120 for a lateral in response to generation of two or more trouble tickets associated with electrical components downstream from the lateral.

The memory can further include a grid topology engine 132. In response to the notification engine 124 receiving the lateral trouble ticket 120, information characterizing the given lateral and transformers downstream from the given lateral indicated by the lateral trouble ticket 120 can be received by the grid topology engine 132. The information indicating the given lateral and transformers downstream from the given lateral is stored as a parent-child hierarchical relationship in a relational database in memory 108, such that each transformer downstream from the given lateral is stored as a child of the given lateral. Alternatively, the parent-child hierarchical relationship of the given lateral and transformers downstream from the given lateral can be stored in a relational database on a server external to memory 108. The grid topology engine 132 can generate a lateral grid topology 136 of the given lateral and transformers downstream from the given lateral. The lateral grid topology 136 can arrange the transformers downstream from the given lateral in a linear hierarchical relationship, such that the transformers downstream from the given lateral are arranged sequentially from the given lateral.

To generate the lateral grid topology 136, the grid topology engine 132 employs location data provided by a geographic information system (GIS) 140. The grid topology engine 132 can query the GIS 140 for location data related to a given lateral identified by a lateral trouble ticket 120. The GIS 140 can store location data in a No Structure Query Language (e.g., NoSQL) database 142 or other data structure. Alternatively, the GIS 140 can store location data in memory 108. The location data provided by the GIS 140 can include spatial and geographic information (e.g., latitude and longitude coordinates) related to the given lateral and transformers downstream from the given lateral. Furthermore, the location data provided by the GIS 140 can include two-dimensional (2D) and three-dimensional (3D) imagery of the given lateral and transformers downstream from the given lateral. Accordingly, the grid topology engine 132 can accurately determine the relationships between each of the transformers downstream from the given lateral using the location data provided by the GIS.

The grid topology engine 132 can be configured to receive and reformat a parent-child hierarchical relationship to a linear hierarchical relationship. Additionally, the grid topology engine 132 can employ location data provided by the GIS 140 to accurately identify and locate conductors that connect each of the transformers and the given lateral. Therefore, the grid topology engine 132 can accurately determine the relationship between each of the transformers downstream from the given lateral, such that the grid topology engine 132 can accurately reformat the parent-child hierarchical relationship into a linear hierarchical relationship. Accordingly, the grid topology engine 132 can generate a lateral grid topology 136 that includes the linear hierarchical relationship that indicates the relationship between each of the transformers downstream from the given lateral. That is, the lateral grid topology 136 generated by the grid topology engine 132 can arrange the transformers downstream from the given lateral in series. Moreover, the lateral grid topology 136 generated by the grid topology engine 132 can include data characterizing the given lateral and downstream transformers, such as global position system (GPS) location coordinates.

Figure 2A:
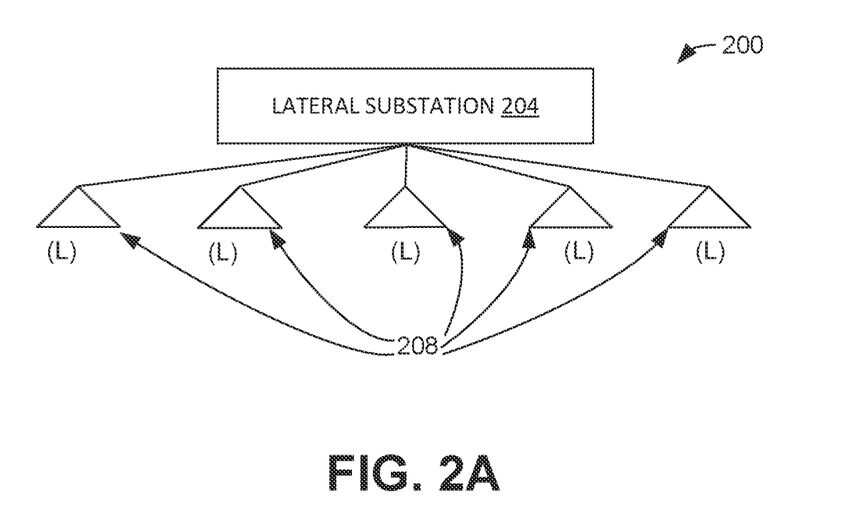
FIG. 2A illustrates an example of a parent-child hierarchical relationship between a lateral transformer and downstream transformers.
Figure 2B:
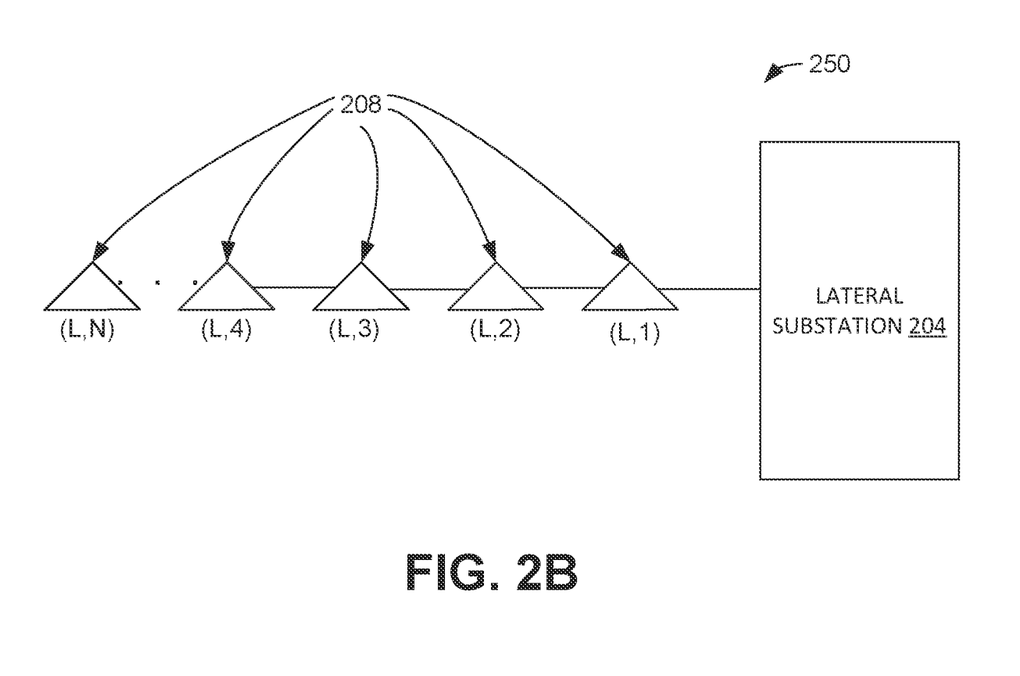
FIG. 2B illustrates an example of a linear hierarchical relationship between a lateral transformer and downstream transformers.

FIGS. 2A-2B illustrate an examples of reformatting a parent-child hierarchical relationship 200 as illustrated in FIG. 2A into a linear hierarchical relationship 250, as illustrated in FIG. 2B. A grid topology engine (e.g., the grid topology engine 132 of FIG. 1) can employ location data provided by a GIS (e.g., the geographic information system 140 of FIG. 1) to reformat a parent-child hierarchical relationship 200 between a given lateral and transformers downstream from the given lateral to a linear hierarchical relationship 250. For purposes of simplification of explanation, FIGS. 2A and 2B employ the same references numbers to denote the same structure.

FIG. 2A illustrates an example of a parent-child hierarchical relationship 200 between a lateral substation 204 and downstream transformers 208. As previously stated, a lateral trouble ticket (e.g., the lateral trouble ticket 120 of FIG. 1) provides information characterizing a given lateral and transformers 208 downstream from the given lateral. The relationships between the given lateral and downstream transformers 208 are stored in a relational database as a parent-child hierarchical relationship 200. Alternatively, the relationships between the given lateral and downstream transformers 208 can be stored as a parent-child hierarchical relationship 200 in memory. That is, each transformer 208 downstream from the given lateral is stored as a child of a lateral substation 204 associated with the given lateral. Accordingly, each transformer 208 downstream from the given lateral can be denoted with a unique identifier (L) to indicate that each transformer 208 is a child of the lateral substation 204 associated with the given lateral. However, the parent-child hierarchical relationship 200 does not characterize a relationship between the transformers 208 downstream from the lateral substation 204 associated with the given lateral. Moreover, because the relationships between the given lateral and downstream transformers is stored in a relational database as a parent-child hierarchical relationship 200, a relationship between each of the downstream transformers 208 cannot be determined by querying the relational database (e.g., using SQL). Particularly, relational databases (e.g., SQL) are limited to tabulation of data and specific data structures (e.g., hierarchyid, Extensible Markup Language (XML)), such as the aforementioned parent-child hierarchical relationship 200. Because the relationship of the given lateral and downstream transformers is stored as parent-child hierarchical relationship 200, SQL queries of the parent-child hierarchical relationship 200 are limited to addressing a single point in the hierarchical relationship. Additionally, because relational databases (e.g., SQL), store data in rows within a table, classification and storage of hierarchical data is limited.

FIG. 2B illustrates an example of a linear hierarchical relationship 250 between the lateral substation 204 and the downstream transformers 208. As previously stated, a linear hierarchical relationship 250 arranges the transformers 208 downstream from the given lateral sequentially from the given lateral. That is, each transformer 208 downstream from the lateral substation 204 associated with the given lateral can be provided a unique identifier (e.g., a number) to indicate the relationship between each transformer 208, in addition to the unique identifier (L) that indicates the lateral substation 204 associated with the given lateral. For example, the first transformer downstream from the lateral substation 204 can be denoted (L,1) to indicate that the first transformer 208 is a child of lateral substation 204 associated with the given lateral and is the first transformer 208 downstream from the given lateral. Additionally, the second transformer 208 downstream from the lateral substation 204 can be denoted (L,2) to indicate that the second transformer 208 is a child of lateral substation 254 associated with the given lateral and is connected to the first (L,1) transformer 208. Accordingly, each transformer 208 downstream from the lateral substation 204 associated with the given lateral can be provided a unique identifier to indicate the parent lateral substation 204 and a relationship to each of the other transformers 208 until a last (L,N) transformer 208 is reached. Moreover, because location data provided by a GIS (e.g., the geographic information system 140 of FIG. 1) is stored in a NoSQL database (e.g., the database 142 of FIG. 1), the relationships between each of the transformers 208 downstream from the lateral substation 204 can be accurately determined by querying the GIS. In contrast to a relational database (e.g., SQL) that stores data in rows of a table, a NoSQL database does not require a predefined schema to store data, such as a table. Rather, a NoSQL database is unstructured and can store related data together. Accordingly, the relationship between each of the transformers 208 downstream from the given lateral can be determined by querying the NoSQL database, in contrast to the parent-child hierarchical relationship which is limited to addressing a single point in the parent-child hierarchical relationship.

Referring back to FIG. 1, the memory 108 further includes a transformer management engine 144. The transformer management engine 144 can employ the lateral grid topology 136 to select a set of smart meters downstream from the given lateral identified by the lateral trouble ticket 120. Accordingly, the transformer management engine 144 can select and associate a first smart meter of the set of smart meters with a first transformer downstream from the given lateral, a penultimate smart meter of the set of smart meters with a penultimate transformer downstream from the given lateral and a last smart meter of the set of smart meters with a last transformer downstream from the given lateral. In other examples, different smart meters in the set of smarter meters can be assigned to the first transformer downstream from the given lateral, the penultimate transformer downstream from the given lateral and the last transformer downstream from the given lateral. In any such example, the set of selected smart meters includes a smart meter recorded as being downstream from the first transformer, a smart meter recorded as being downstream from the penultimate transformer and a smart meter recorded as being downstream from the last transformer.

Moreover, the transformer management engine 144 can provide a request to a smart meter management engine 148 to ping the selected set of smart meters associated with the first, penultimate and last transformers downstream from the given lateral. The smart meter management engine 148 can be external to the memory 108 and can be employed by a computer or server that is capable of wireless communications. Accordingly, the smart meter management engine 148 can communicate with the selected set of smart meters via a utility network 152. The utility network 152 can be an Internet Protocol version 6 (IPv6) network, 5G broadband network, a 4G Long Term Evolution (LTE) network, or local area network (LAN) compatible with Institute of Electrical and Electronics Engineers (IEEE) 802 Standards. Particularly, the transformer management engine 144 can request the smart meter management engine 148 to ping the selected set of smart meters via the utility network 152. In response, the smart meter management engine 148 can ping each of the selected set of smart meters and receive results of each of the pings to the selected set of smart meters. Accordingly, the transformer management engine 144 can receive results of each of the pings to the selected set of smart meters from the smart meters management engine 148. A transformer can have about 10 smart meters downstream and a lateral can have 15-20 transformers downstream, such that the utility network can serve hundreds of smart meters for multiple laterals. Because the transformer management engine selects three smart meters (e.g., the first, penultimate and last) rather than each smart meter downstream from a given lateral (e.g., two hundred smart meters), the transformer management engine 144 can prevent congestion of the utility network 152.

As previously stated, the grid topology engine 132 can generate a lateral grid topology 136 by employing location data provided by the GIS 140 to reformat the parent-child hierarchical relationship (e.g., the parent-child hierarchical relationship 200 of FIG. 2A) to the linear hierarchical relationship (e.g., the linear hierarchical relationship 250 of FIG. 2B). That is, the lateral grid topology 136 includes the linear hierarchical relationship provided by the grid topology engine 132. Accordingly, the transformer management engine 144 can leverage the lateral grid topology 136 to determine a set of smart meters to be pinged.

The memory 108 further includes an event processing engine 156. The event processing engine 156 is configured to receive, from the transformer management engine 144, the results of the pings to the set of smart meters downstream from the given lateral. In response to receiving the results of the pings to the set of smart meters downstream from the given lateral, the event processing engine 156 can determine a cause of the lateral trouble ticket 120. Accordingly, the ticket management engine 128 can augment the lateral trouble ticket based on the cause of the lateral trouble ticket 120 determined by the event processing engine 156. Particularly, the event processing engine 156 can accurately determine the cause of the lateral trouble ticket 120 based on the results of the pings to the set of smart meters (e.g., three smart meters), rather than results of pings to each of the smart meters downstream from the given lateral (e.g., two hundred smart meters). Alternatively, the event processing engine 156 can augment the lateral trouble ticket 120.

For example, if each of the first, penultimate and last smart meter indicate that the first, penultimate and last transformers downstream from the given lateral are offline, the event processing engine 156 can determine that the cause of the lateral trouble ticket 120 is a blown fuse. Thus, the ticket management engine 128 can augment the lateral trouble ticket 120 to indicate a blown fuse, such that a blown fuse needs to be serviced to remedy the lateral trouble ticket 120. Accordingly, a service crew that is capable a servicing a blown fuse can receive the augmented lateral trouble ticket 120 and be dispatched in response to the augmentation of the lateral trouble ticket 120 by the ticket management engine 128.

In another example, the last and penultimate smart meter indicate that the last and penultimate transformers downstream from the given lateral are offline, and the first smart meter indicates that the first transformer downstream from the given lateral is online. Accordingly, the event processing engine 156 can determine that the cause of the lateral trouble ticket 120 is a wire down, such that a conductor (e.g., a power line) downstream from the given lateral has been disconnected. That is, the event processing engine 156 can determine detect a conductor discontinuity downstream from the given lateral based on ping results from smart meters associated with the first, penultimate and last transformers. Thus, the ticket management engine 128 can augment the lateral trouble ticket 120 to indicate a wire down, such that a wire down needs to be serviced to remedy the lateral trouble ticket 120. Accordingly, a service crew that is capable of servicing a wire down can receive the augmented lateral trouble ticket 120 or be dispatched in response to the augmentation of the lateral trouble ticket 120. In other examples, other causes of the trouble ticket can be determined by the event processing engine 156.

The power grid monitoring system 100 can be employed to determine a cause of the lateral trouble ticket 120 by pinging a set of smart meters, thereby obviating the need for an investigative service crew and preventing network congestion of the utility network 152. That is, the cause of the lateral trouble ticket 120 can be determined by the power grid monitoring system 100 by pinging a set of smart meters selected and associated with each of the first, penultimate and last transformers downstream from a given lateral identified by the lateral trouble ticket 120 and analyzing the results of the ping.

Particularly, each of the smart meters of the selected set of smart meters are coupled to a corresponding power consuming premises (e.g., a customer). The results of pings to a given smart meter can indicate whether voltage is being supplied to the given smart meter. Accordingly, if the results of the pings to the given smart meter indicate that voltage supplied to the given smart meter is below a predetermined threshold, it can be further determined that a corresponding power consuming premises coupled to the given smart meter is not receiving voltage. Similarly, if the results of the pings to the given smart meter indicate a timeout, it can be determined that the corresponding power consuming premises coupled to the given smart meter is not receiving voltage. Therefore, in either such situation, it can be further determined that a transformer upstream from the given smart meter is offline because the transformer is failing to supply voltage to the corresponding power consuming premises coupled to the given smart meter.

Additionally, the results of the pings to the given smart meter can indicate that the corresponding power consuming premises coupled to the given smart meter is receiving voltage by indicating that voltage supplied at the given smart meter coupled to the corresponding power consuming premises is above the predetermined threshold. Accordingly, it can be further determined that a transformer upstream from the given smart meter is online because the transformer is providing voltage to the given smart meter coupled to the corresponding power consuming premises. By pinging a set of selected smart meters downstream associated with the first, penultimate and last transformers, the state of the first, penultimate and last transformers can be determined. That is, it can be determined whether each of the first, penultimate and last transformers are online or offline based on the results of the pings.

Moreover, a cause of the lateral trouble ticket 120 associated with the given lateral upstream from the first, penultimate and last transformers can be determined based on the state of the first, penultimate and last transformers. Accordingly, pinging the selected set of smart meters can determine the cause of the lateral trouble ticket 120 without deploying the investigative service crew to investigate the lateral trouble ticket 120 and determine the cause of the lateral trouble ticket 120. During the time span that the investigative service crew is deployed and investigating, customers downstream from the given lateral associated with the lateral trouble ticket 120 can be without power and in danger if the cause of the lateral trouble ticket 120 is a live downed wired.

As previously stated, the set of smart meters selected by the power grid monitoring system 100 include a smart meter associated with each of a first, penultimate and last transformer. Accordingly, the power grid monitoring system 100 can ping the selected set of smart meters (e.g., three smart meters) to determine the cause of the lateral trouble ticket 120, rather than pinging each smart meter downstream from each transformer (e.g., 15-20 transformers) or each smart meter downstream from the given lateral (e.g., about 150-200 smart meters). Therefore, the power grid monitoring system 100 can prevent network congestion on the utility network 152 by substantially reducing the number of smart meters pinging to determine the cause of the lateral trouble ticket 120. Accordingly, the power grid monitoring system 100 reduces the likelihood that the utility network 152 becomes congested such that packets cannot be delivered (e.g., to electrical components) and dropped.

Figure 3:
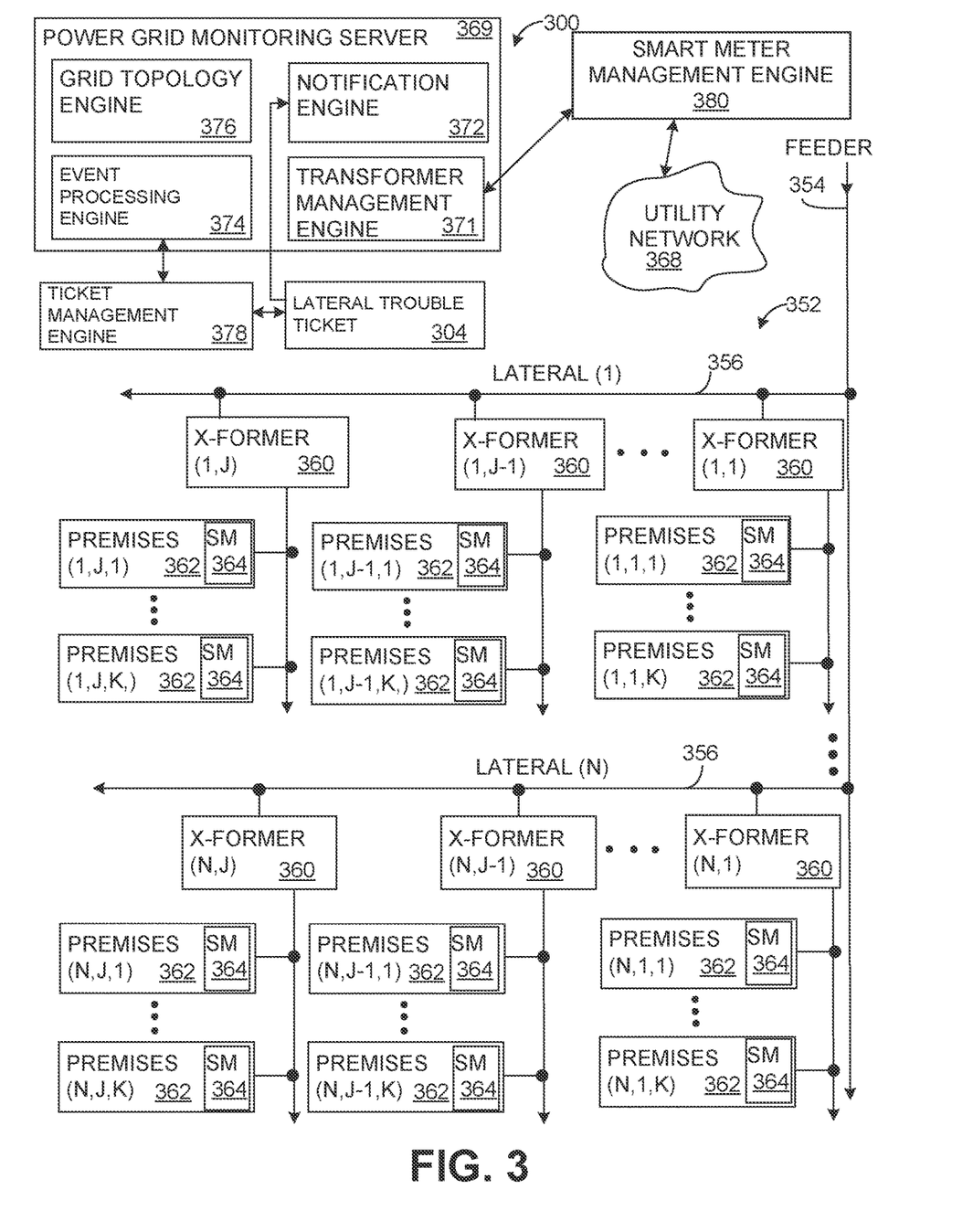
FIG. 3 illustrates an example of an electric power distribution system that can determine a cause for a lateral trouble ticket.

FIG. 3 illustrates an example of an electric power distribution system 300 that can determine a cause for a lateral trouble ticket 304. The electric power distribution system 300 is employable to implement the power grid monitoring system 100 of FIG. 1. The electric power distribution system 300 can include a power grid 352. For purposes of simplification and explanation, only some of the elements of the power grid 352 are illustrated. However, it is understood, that elements of the power grid 352 that are not shown in FIG. 1 can be implemented in a different manner.

The power grid 352 can include a feeder 354, or a plurality of feeders 354 that distribute power to a plurality of downstream laterals 356. The feeder 354 receives voltage from a substation coupled (via an electric power line) to a power generation source. The feeder 354 can be formed as a power line (e.g., an electric power line). The feeder 354 can include N number of laterals 356, wherein N is an integer greater than or equal to one. Particularly, the feeder 354 can distribute voltage to each of the N laterals 356 downstream from the feeder 354. Moreover, each of the N laterals 356 are coupled to K number of power consuming premises 362, where K is an integer greater than or equal to one. Each of the power consuming premises 362 includes a smart meter 364 (labeled in FIG. 3 as "SM") installed therein. Each smart meter 364 is capable of wireless communications via a utility network 368 (e.g., the utility network 152 of FIG. 1). Each power grid element (e.g., an electrical component) of the power grid 352 is identifiable by an index number and a unique alpha numeric value. The index number of a given component identifies the given component and upstream components of the given component. For example, the Jth transformer 360 on the first lateral 356 can be referenced as X-FORMER (1,J). Similarly, the Kth power consuming premises 362 coupled to the 1st X-FORMER 360 of the Nth lateral 356 can be referred to as premises (N,1,K). Thus, the index number identifies a logical position of each power grid element in the power grid 352. Further, it is understood the values of J and K may be different for each brand of the feeder 354. Additionally, or alternatively, the power grid 352 can include R number of feeders, such that an index including R can indicate the specific feeder 354 in a plurality of feeders 354.

The electric power distribution system 300 can further include a power grid monitoring server 369 (e.g., the power grid monitoring server 116 of FIG. 1). The power grid monitoring server 369 can include a transformer management engine 371 (e.g., the transformer management engine 144 of FIG. 1), a notification engine 372 (e.g., the notification engine 124 of FIG. 1, an event processing engine 374 (e.g., the event processing engine 156 of FIG. 1) and a grid topology engine 376 (e.g., the grid topology engine 132 of FIG. 1). In an example, customers at the (1,1,K) and (1,1,1) power consuming premises 362 can report a power outage. That is, premises downstream from the (1,1) transformer 360 can report a power outage, such that a trouble ticket associated with the (1,1) transformer 360 can be generated by a ticket management engine 378 (e.g., the ticket management engine 128 of FIG. 1). The ticket management engine 378 can elevate the trouble ticket associated with the (1,1) transformer 360 to a trouble ticket associated with the (1) lateral 356 in response to customers at premises associated with a (1,J) transformer 360 reporting a power outage.

The notification engine 372 of the power grid monitoring server 369 can receive the lateral trouble ticket 304 in response to the ticket management engine 378 generating the lateral trouble ticket 304. In response to the notification engine 372 receiving the lateral trouble ticket 304, the grid topology engine 376 can receive information characterized by the lateral trouble ticket 304, such as information concerning the (1) lateral 356. As previously stated, the information characterizing the lateral trouble ticket 304 that describes the relationship between (1) lateral 356 and transformers 360 downstream from the (1) lateral 356 is stored as a parent-child hierarchical relationship (e.g, 200 of FIG. 2). That is, the lateral trouble ticket 304 can provide an identifier that uniquely identifies transformers 360 downstream from (1) later 356 by identifying (1) lateral 356 as an upstream lateral, but the lateral trouble ticket 304 does not provide an identifier to uniquely identify each particular transformer 360. Accordingly, the grid topology engine 376 can generate a lateral grid topology (e.g., the lateral grid topology 136 of FIG. 1) in response to receiving information characterizing the (1) lateral 356 trouble ticket. By employing location data provided by a geographic information system (GIS) (e.g., the geographic information system 140 of FIG. 1), the grid topology engine 376 can generate the lateral grid topology to include a linear hierarchical relationship (e.g., the linear hierarchical relationship 250 of FIG. 2B) between each of the transformers 360 downstream from the (1) lateral 356. That is, the lateral grid topology can provide an identifier for transformers 360 downstream from (1) lateral 356 that uniquely identifies upstream (1) lateral 356, as well as the particular transformer 360. Accordingly, each transformer 360 downstream from a lateral 356 associated with the lateral trouble ticket 304 can be identified by the lateral grid topology, as well as the relationship between each of the transformers 360. For example, the lateral grid topology can uniquely identify the last transformer 360 downstream from the first (1) lateral 356 as (1,J) and the penultimate transformer 360 downstream from the first (1) lateral 356 as (1,J−1).

The transformer management engine 371 can employ the lateral grid topology to select a set of transformers 360 downstream from a lateral 356. In response to the grid topology engine 376 generating the lateral grid topology, the transformer management engine 371 can select the first, penultimate and last transformer 360 downstream from a lateral 356 identified by the lateral trouble ticket 304. For example, if the lateral trouble ticket 304 identifies the (1) lateral 356, the transformer management engine 371 can employ the lateral grid topology to select the last (1,J) transformer, penultimate (1,J−1) transformer and first (1,1) transformer downstream from the (1) lateral 356. Alternatively, if the lateral trouble ticket 304 identifies the (N) lateral 356, the transformer management engine 371 can employ the lateral grid topology to select the last (N,J) transformer 360, penultimate (N, J−1) transformer 360 and first (N,1) transformer 360 downstream from the (N) lateral 356.

Additionally, the transformer management engine 371 can associate a smart meter 364 downstream from a selected transformer 360 with the selected transformer 360. As previously stated, a power consuming premises 362 downstream from a transformer 360 can include a smart meter 364. In an example, if the (1,J) transformer 360 is selected as the last transformer 360 downstream from the (1) lateral 356, the transformer management engine 371 can associate a smart meter at (1,J,K) power consuming premises 362 with the (1,J) transformer 360. Accordingly, the transformer management engine 371 can associate a smart meter 364 for each selected transformer 360. Therefore, if the lateral trouble ticket 304 identifies the (1) lateral 356, the transformer management engine 371 can associate a smart meter 364 for the (1,J) transformer 360, the (1,J−1) transformer 360 and the (1,1) transformer 360. Once a smart meter 364 has been associated with each of the selected transformers 360, the transformer management engine 371 can request a smart meter management engine 380 to ping each of the smart meters 364 associated with the selected transformers 360. In response, the smart meter management engine 380 can ping each of the smart meters 364 associated with the selected transformers 360, via the utility network 368. Accordingly, the smart meter management engine 380 can receive responses from each of the smart meters 364 associated with the selected transformers 360 and forward the responses to the transformer management engine 371.

The event processing engine 374 can determine a cause of the lateral trouble ticket 304 based on the results of the pings to the smart meters 364 associated with selected transformers 360. Particularly, the event processing engine 374 is configured to receive the results of the pings to the smart meters 364 associated with the selected transformers from the transformer management engine 371. The results of pings to a given smart meter 364 can indicate that a transformer 360 associated with the given smart meter 364 is online or offline. Particularly, results of pings to the given smart meter 364 indicate whether a corresponding power consuming premises 362 is provided voltage by an upstream transformer 360. That is, if results of pings to the given smart meter 364 indicate that the given smart meter 364 coupled to the corresponding power consuming premises 362 is supplied voltage below a predetermined threshold, it can be further determined that the upstream transformer 360 is offline. Furthermore, if the results of the pings to the given smart meter 364 indicate a timeout from the given smart meter 364, it can be further determined that the upstream transformer 360 is offline. Additionally, if results of pings to the given smart meter 364 indicate that the given smart meter 364 coupled to the corresponding power consuming premises 362 is supplied voltage above the predetermined threshold, it can be further determined that the upstream transformer 360 is online. That is, a state of the upstream transformer 360 can be determined based on results of pings to the given smart meter 364. Accordingly, the event processing engine 374 can determine the cause of the lateral trouble ticket 304 based on the results of pings to smart meters 364 associated with the first, penultimate and last transformer 360 downstream from the lateral 356 identified by the lateral trouble ticket 304.

FIGS. 4A-F illustrate results of pings to a selected set of transformers downstream from a given lateral. Lateral substation 404 of FIGS. 4A-F can represent a lateral substation (e.g., 204 of FIGS. 2A and 2B), to which downstream transformers 408 are coupled (e.g., 208 of FIGS. 2A and 2B). Alternatively, the lateral substation 404 of FIGS. 4A-4F can be a given lateral indicated by a lateral trouble ticket (e.g., the lateral trouble ticket 304 of FIG. 3) generated by a ticket management engine (e.g., the ticket management engine 378 of FIG. 3). As illustrated, the lateral substations 404 and downstream transformers 408 are arranged in a linear hierarchical relationship (e.g., the linear hierarchical relationship 250 of FIG. 2B), such that the relationship of the downstream transformers has been determined by a grid topology engine (e.g., the grid topology engine 376 of FIG. 3). Additionally, FIGS. 4A-4F each illustrate a first transformer 408 downstream from the lateral substation 404 denoted as (N,1), a penultimate transformer 408 downstream from the lateral substation 404 denoted as (N,J−1) and a last transformer 408 downstream from the lateral substation 404 denoted as (N,J) selected by a transformer management engine (e.g., the ticket management engine 378 of FIG. 3). Furthermore, the transformer management engine can select, associated and ping a smart meter (e.g., the smart meter ("SM") 364 of FIG. 3) downstream from each of the first (N,1), penultimate (N, J−1) and last (N,J) transformers 408. Accordingly, FIGS. 4A-4F illustrate the results of the pings to the selected set of smart meters, which are provided to an event processing engine (e.g., the event processing engine 374 of FIG. 3) to determine a cause of a lateral trouble ticket (e.g., the lateral trouble ticket 304 of FIG. 3). Particularly, each transformer 408 in FIGS. 4A-4F is surrounded by a circle, which indicates a state of the transformer based on results of the pings to the smart meters downstream from the transformers 408. Accordingly, solid circle surrounding a given transformer 408 indicates that the given transformer 408 is online. A dashed circle surrounding a given transformer 408 indicates that the given transformer 408 is offline. For purposes of simplification of explanation, FIGS. 4A-4F employ the same reference numbers to denote the same structure.

Figure 4A:
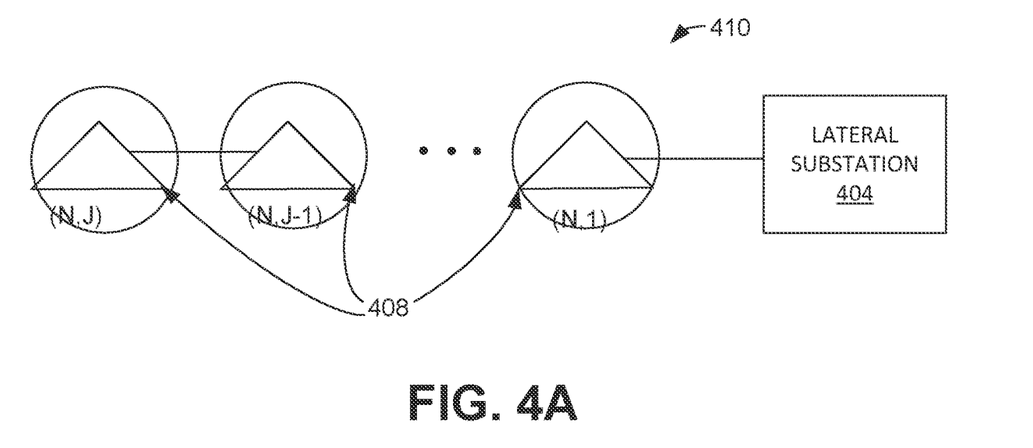
FIG. 4A illustrates an example of ping results that indicate no problem with a given lateral.

FIG. 4A illustrates results of pings to a first, penultimate and last transformer 408 downstream from a lateral substation 404 that indicate no problem 410 with a given lateral associated with the lateral substation 404. As illustrated, each transformer 408 in FIG. 4A is surrounded by a solid circle, indicating that each of the transformers 408 is determined to be online based on results of pings to a selected set of smart meters downstream from each of the transformers 408. Because each of the transformers 408 are determined to be online, it can be further determined that there is no problem 410 with the given lateral associated with lateral substation 404.

Referring back to FIG. 3, the event processing engine 374 can determine that each of the first, penultimate and last transformers 360 (e.g., the transformers 408 of FIG. 4A) are online based on results of the pings to the selected set of smart meters 364 downstream from the first, penultimate and last transformers. Accordingly, if the event processing engine 374 determines each of the first, penultimate and last transformer 360 are online, the event processing engine 374 can determine that there is no problem (e.g., ping results 410 of FIG. 4A) with the given lateral coupled to the first, penultimate and last transformers 360. Thus, the event processing engine 374 can determine that a cause of a lateral trouble ticket 304 (e.g., the lateral trouble ticket 120 of FIG. 1) associated with the given lateral is erroneous. For example, the cause of the lateral trouble ticket 304 could be the result of a user(s) that reported an outage that is responsible for the lateral trouble ticket 304 being elevated by the ticket management engine 378 being misattributed to the given lateral 356. Alternatively, the lateral trouble ticket could have been elevated in response to a user(s) reporting an outage that was remedied without a service crew. For example, the lateral trouble ticket could be elevated, but the user(s) that reported the outage could have reset a circuit breaker at a corresponding power consuming premises 362. Accordingly, a given smart meter at the corresponding power consuming premises will return ping results that indicate that the power consuming premises 362 is supplied voltage above a predetermined threshold. Therefore, the event processing engine 374 can determine that there is no problem with the given lateral, although a trouble ticket associated with the reported outage resulted in elevation to the lateral trouble ticket 304. In response, the ticket management engine 378 can augment the lateral trouble ticket 304 to indicate that there is no problem with the given lateral 356. Thus, a lateral trouble ticket 304 that has been augmented to indicate that there is no problem with the given lateral 356 can further augmented by the ticket management engine 378 to indicate that no service crew is required to remedy the lateral trouble ticket 304. Alternatively, a lateral trouble ticket 304 that is augmented to indicate that there is no problem with the given lateral 356 can be returned to the ticket management engine 378, such that the ticket management engine 378 can determine that no service crew is required to remedy the lateral trouble ticket 304.

Figure 4B:
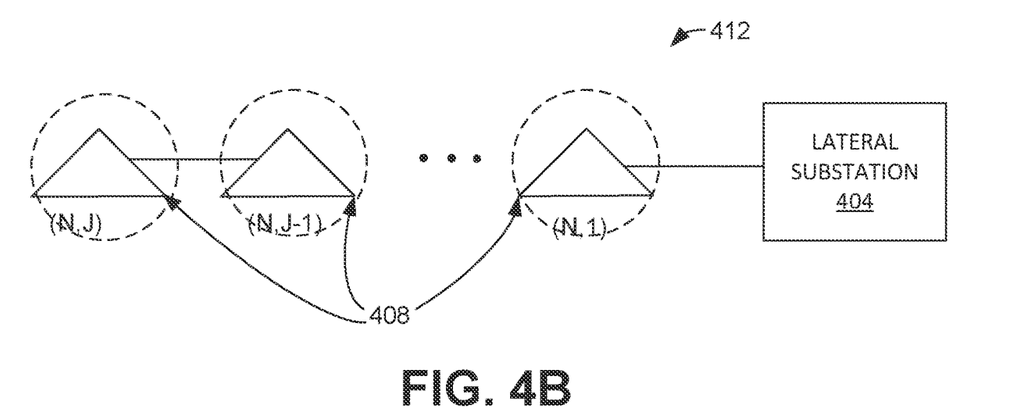
FIG. 4B illustrates an example of ping results that indicate a blown fuse.

FIG. 4B illustrates results of pings to a first, penultimate and last transformer 408 downstream from a lateral substation 404 that indicate a blown fuse 412 at a given lateral associated with the lateral substation 404. As illustrated, each transformer 408 in FIG. 4B is surrounded by a dashed circle, indicating that each of the transformers 408 is determined to be offline based on results of pings to a selected set of smart meters downstream from each of the transformers 408. Because each of the transformers 408 are determined to be offline, it can be further determined that there is a blown fuse 412 at the given lateral associated with lateral substation 404. Particularly, it can be determined that a blown fuse 412 at a junction between the given lateral and transformers 408 downstream from the given lateral is the cause of power loss at each of the transformers 408 downstream from the given lateral, as indicated by state of the transformers 408 being offline.

Referring back to FIG. 3, the event processing engine 374 can determine that each of the first, penultimate and last transformers 360 (e.g., transformers 408 of FIG. 4A) are offline based on results of the pings to the selected set of smart meters downstream from the first, penultimate and last transformers. Accordingly, if the event processing engine 374 determines each of the first, penultimate and last transformer 360 are offline, the event processing engine 374 can determine that there is a blown fuse (e.g., ping results 412 of FIG. 4B) with the given lateral 356 coupled to the first, penultimate and last transformers 360. Thus, the event processing engine 374 can determine that a cause of the lateral trouble ticket 304 associated with the given lateral 356 is a blown fuse. In response, the ticket management engine 378 can augment the lateral trouble ticket 304 to indicate that there is a blown fuse at the given lateral 356. Thus, a lateral trouble ticket 304 that has been augmented to indicate that there is a blown fuse at the given lateral 356 can be further augmented by the ticket management engine 378 to indicate a service crew capable of servicing a blown fuse is required to remedy the lateral trouble ticket 304. Alternatively, a lateral trouble ticket 304 that is augmented to indicate that there is a blown fuse at the given lateral 356 can be returned to the ticket management engine 378, such that the ticket management engine 378 can determine that a service crew capable of servicing a blown fuse is required to remedy the lateral trouble ticket 304.

Figure 4C:
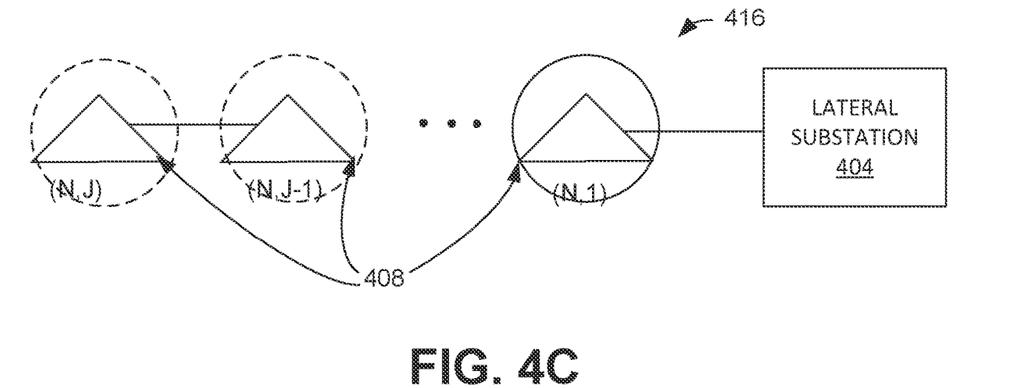
FIG. 4C illustrates an example of ping results that indicate a wire down.

FIG. 4C illustrates results of pings to a first, penultimate and last transformer 408 downstream from a lateral substation 404 that indicate a wire down 416 at a given lateral associated with the lateral substation 404, such that a conductor downstream from the lateral substation 404 has been disconnected (e.g., a conductor discontinuity is detected). As illustrated, the first transformer 408 in FIG. 4C is surrounded by a solid circle, indicating that the first transformer 408 is determined to be online based on results of pings to a selected smart meter downstream from the first transformer 408. Additionally, the last and penultimate transformer 408 in FIG. 4C are surrounded by a dashed circle, indicating that the last and penultimate transformers 408 are determined to be offline based on results of pings to selected smart meters downstream from the last and penultimate transformers 408. Because the last and penultimate transformers 408 are determined to be offline, and the first transformer 408 is determined to be online, it can be further determined that there is a wire down 416 downstream from the given lateral associated with lateral substation 404 and downstream from the first transformer 408 (transformer N,1). Particularly, it can be determined that a wire down 416 between the transformers 408 downstream from the given lateral is the cause of power loss to at least the last and penultimate transformers 408, as indicated by state of the transformers 408 as illustrated in FIG. 4C.

Referring back to FIG. 3, the event processing engine 374 can determine that the first transformer 360 (e.g., transformers 408 of FIG. 4C) is online and that the last and penultimate transformers 360 (e.g., transformers 408 of FIG. 4C) are offline based on results of the pings to the selected set of smart meters 364 downstream from the first, penultimate and last transformers 360. Accordingly, if the event processing engine 374 determines that the first transformer 360 is online and that the penultimate and last transformer 360 are offline, the event processing engine 374 can determine that there is a wire down (e.g., ping results 416 of FIG. 4C) downstream from the given lateral 356 coupled to the first, penultimate and last transformers 360. Thus, the event processing engine 374 can determine that a cause of the lateral trouble ticket 304 associated with the given lateral 356 is a wire down (e.g., a conduct discontinuity is detected). In response, the ticket management engine 378 can augment the lateral trouble ticket 304 to indicate that there is a wire down downstream from the given lateral 356. Thus, a lateral trouble ticket 304 that has been augmented to indicate that there is a wire down downstream from the given lateral 365 can be further augmented by the ticket management engine 378 to indicate a service crew capable of servicing a down wire is required to remedy the lateral trouble ticket 304.

A service crew capable of servicing a wire down (e.g., ping results 416 of FIG. 4C) is capable of servicing both a wire down and blown fuse. Particularly, a service crew that is deployed to service a wire down is equipped with heavy equipment, such as a crane (e.g., equipment to elevate a wire and/or a service crew), a device to test whether the wire down is live, a device to ground a live wire, and a device to reconnect the wire down. Although a service crew capable of servicing a wire down is deployed with heavy equipment, the service crew capable of service a wire down is also capable of servicing a blown fuse because a blown fuse does not require heavy equipment. In contrast, a service crew capable of servicing a blown fuse (e.g., ping results 412 of FIG. 4B) is not necessarily capable of servicing a wire down because a service crew capable of servicing a blown fuse may not be deployed with heavy equipment.

As previously stated, the event processing engine 374 can determine that the cause of the lateral trouble ticket 304 is a blown fuse (e.g., ping results 412 of FIG. 4B) in response to determining that each of the first, penultimate and last transformer 360 downstream from the given lateral is offline. However, in some examples, each of the first, penultimate and last transformer 360 can be offline due to a wire down. Particularly, if a wire down is grounded (e.g., by touching the earth), transformers 360 upstream from the wire down, including the first transformer 360 downstream from the given lateral 356, will experience a power outage. Therefore, each of the first, penultimate and last transformer 360 will be determined to be offline, resulting in the lateral trouble ticket 304 being augmented to require a service crew capable of servicing a blown fuse. Because a down wire that is grounded or not live is not dangerous, a service crew capable of servicing a blown fuse for a grounded wire down or not live wire is acceptable.

Figure 4D:
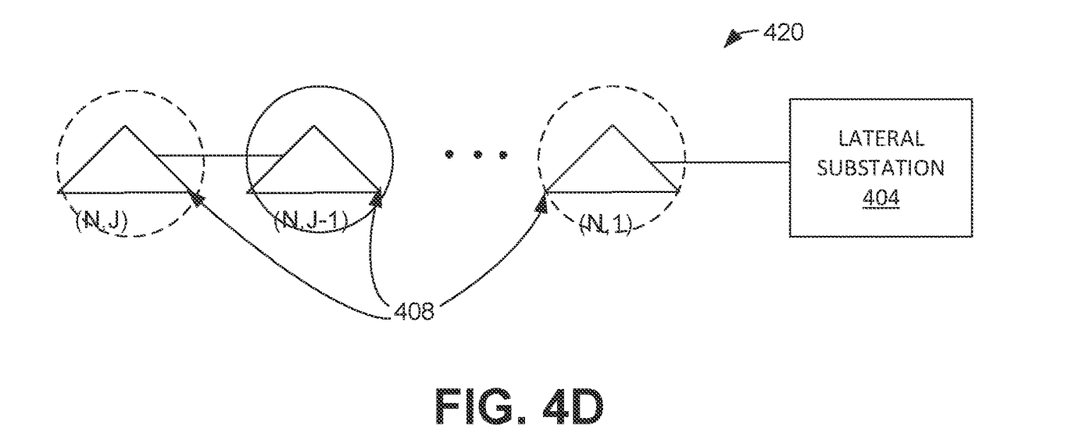
FIG. 4D illustrates an example of ping results that indicate a misattributed smart meter.
Figure 4E:
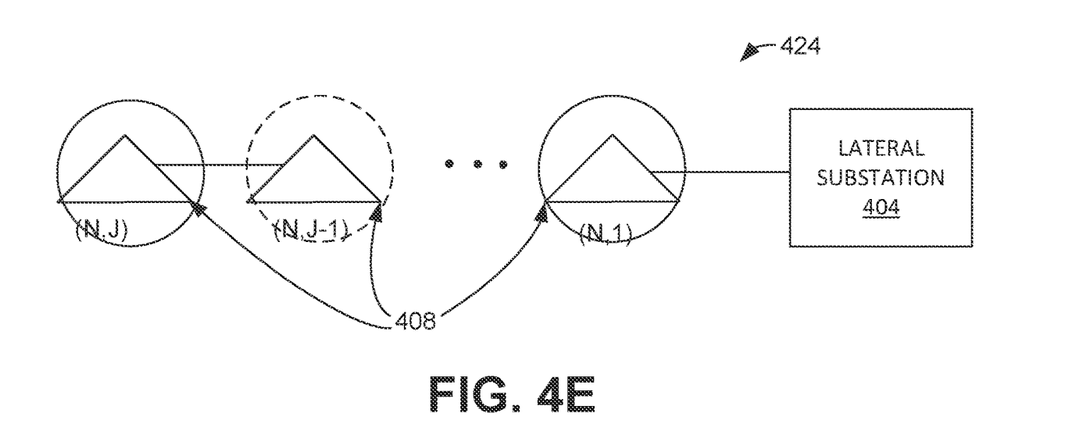
FIG. 4E illustrates another example of ping results that indicate a misattributed smart meter.
Figure 4F:
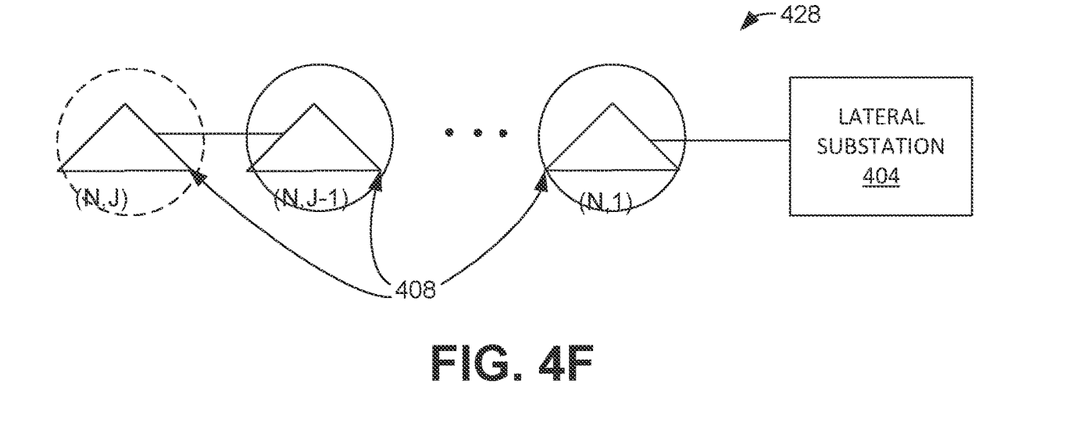
FIG. 4F illustrates another example of ping results that indicate a misattributed smart meter.

FIGS. 4D-4F illustrate results of pings to a first, penultimate and last transformer 408 downstream from a lateral substation 404 associated with a given lateral that can indicate a misattributed smart meter. A misattributed smart meter is a smart meter (e.g., smart meter "SM" 364 of FIG. 3) that has been incorrectly attributed to the given lateral (e.g., lateral "LATERAL" 356 of FIG. 3), such that the smart meter is actually downstream from another lateral. Accordingly, the misattributed smart meter can correspond to a power consuming premises (e.g., power consuming premises "PREMISES" 362 of FIG. 3) associated with a given transformer (e.g., transformer "X-FORMER" 360 of FIG. 3) downstream from the given lateral, but results of pings to the smart meter can indicate a state of another transformer downstream from the other lateral. A misattributed smart meter can be incorrectly attributed to a given lateral due to power restoration operations. For example, when a customer premises has power restored following a weather event, the customer premises may be reconnected to another transformer or lateral without having a relationship updated between the customer premises and transformer. Additionally, a misattributed smart meter can be due to the customer premises being incorrectly associated by location data provided by a GIS (e.g., geographic information system 140 of FIG. 1). Therefore, a misattributed smart meter downstream from the first transformer 408 can results in erroneous ping results from a selected smart meter downstream from the first transformer.

FIG. 4D illustrates results of pings to a first, penultimate and last transformer 408 downstream from a lateral substation 404 that indicate a misattributed smart meter 420 downstream from a given lateral associated with the lateral substation 404. As illustrated, the first transformer and last transformers 408 in FIG. 4D are surrounded by a dashed circle, indicating that the first and last transformers 408 can be determined to be offline based on results of pings to selected smart meters downstream from the first and last transformers 408. Additionally, the penultimate transformer 408 in FIG. 4D is surrounded by a solid circle, indicating that the penultimate transformer 408 is determined to be online based on results of ping to a selected smart meter downstream from the penultimate transformer 408. Because it is unlikely that the first and last transformers 408 are offline while the penultimate transformers 408 is online, it can be determined that a misattributed smart meter is downstream from the lateral substation 404. Additionally, it is unlikely that there are two more misattributed smart meters downstream from the lateral substation 404. Accordingly, it can be determined that the penultimate transformer 408 is actually offline. Particularly, it can be determined that a blown fuse (e.g., ping results 412 of FIG. 4B) between the transformers 408 downstream from the given lateral is the actual cause of power loss to at least the first and last transformers 408, as indicated by state of the transformers 408 as illustrated in FIG. 4D.

FIG. 4E illustrates results of pings to a first, penultimate and last transformer 408 downstream from a lateral substation 404 that indicate a misattributed smart meter 424 downstream from a given lateral associated with the lateral substation 404. As illustrated, the first transformer and last transformers 408 in FIG. 4E are surrounded by a solid circle, indicating that the first and last transformers 408 can be determined to be online based on results of pings to selected smart meters downstream from the first and last transformers 408. Additionally, the penultimate transformer 408 in FIG. 4E is surrounded by a dashed circle, indicating that the penultimate transformer 408 is determined to be offline based on results of pings to a selected smart meter downstream from the penultimate transformer 408. Because it is unlikely that the first and last transformers 408 are online while the penultimate transformer 408 is offline, it can be determined that a misattributed smart meter is downstream from the lateral substation 404. Additionally, it is unlikely that there are two more misattributed smart meters downstream from the lateral substation 404. Accordingly, it can be determined that the last transformer 408 is actually offline. Particularly, it can be determined that a wire down (e.g., ping results 416 of FIG. 4C) between the transformers 408 downstream from the given lateral is the actual cause of power loss to at least the penultimate transformer 408, as indicated by state of the transformers 408 as illustrated in FIG. 4E. Alternatively, it can be determined that the penultimate transformer 408 is actually online. Therefore, it can be determined that each of the transformers 408 are online, such that it can be further determined that there is no problem (e.g., ping results 410 of FIG. 4A) with the given lateral associated with lateral substation 404.

FIG. 4F illustrates results of pings to a first, penultimate and last transformer 408 downstream from a lateral substation 404 that indicate a misattributed smart meter 428 downstream from a given lateral associated with the lateral substation 404. As illustrated, the first transformer and penultimate transformers 408 in FIG. 4E are surrounded by a solid circle, indicating that the first and penultimate transformers 408 can be determined to be online based on results of pings to selected smart meters downstream from the first and last transformers 408. Additionally, the last transformer 408 in FIG. 4E is surrounded by a dashed circle, indicating that the last transformer 408 is determined to be offline based on results of pings to a selected smart meter downstream from the penultimate transformer 408. Because it is unlikely that the first and penultimate transformers 408 are online while the last transformer 408 is offline, it can be determined that a misattributed smart meter is downstream from the lateral substation 404. Additionally, it is unlikely that there are two more misattributed smart meters downstream from the lateral substation 404. Accordingly, it can be determined that the penultimate transformer 408 is actually offline. Particularly, it can be determined that a wire down (e.g., ping results 416 of FIG. 4C) between the transformers 408 downstream from the given lateral is the actual cause of power loss to at least the last transformer 408, as indicated by state of the transformers 408 as illustrated in FIG. 4F. Alternatively, it can be determined that the last transformer 408 is actually online. Therefore, it can be determined that each of the transformers 408 are online, such that it can be further determined that there is no problem (e.g., ping results 410 of FIG. 4A) with the given lateral associated with lateral substation 404.

Referring back to FIG. 3, the power grid monitoring server 369 can be employed to determine a cause of a lateral trouble ticket 304. Particularly, a transformer management engine 371 can request a smart meter management engine 380 to ping a selected set of smart meters 364 (e.g., three smart meters), rather than pinging each smart meter 364 downstream from each transformer 360 (e.g., 15-20 transformers) or each smart meter 364 downstream from the given lateral 356 (e.g., about 150-200 smart meters). Thus, the event processing engine 374 can determine the cause (e.g., such as ping results 410, 412, 416, 420, 424 or 428 of FIGS. 4A-4F) of the lateral trouble ticket 304 based on the results of the pings to the selected smart meters 364 (e.g., three smart meters). Therefore, the power grid monitoring server 369 can prevent network congestion on the utility network 368 by substantially reducing the number of smart meters pinging to determine the cause of the lateral trouble ticket 304. Accordingly, the power grid monitoring server 369 reduces the likelihood that the utility network 368 becomes congested such that packets cannot be delivered (e.g., to electrical components) and dropped. Moreover, pinging the selected set of smart meters 364 to determine the cause of the lateral trouble ticket 304 eliminates the need to deploy an investigative crew to determine the cause of the lateral trouble ticket 304.

Figure 5:
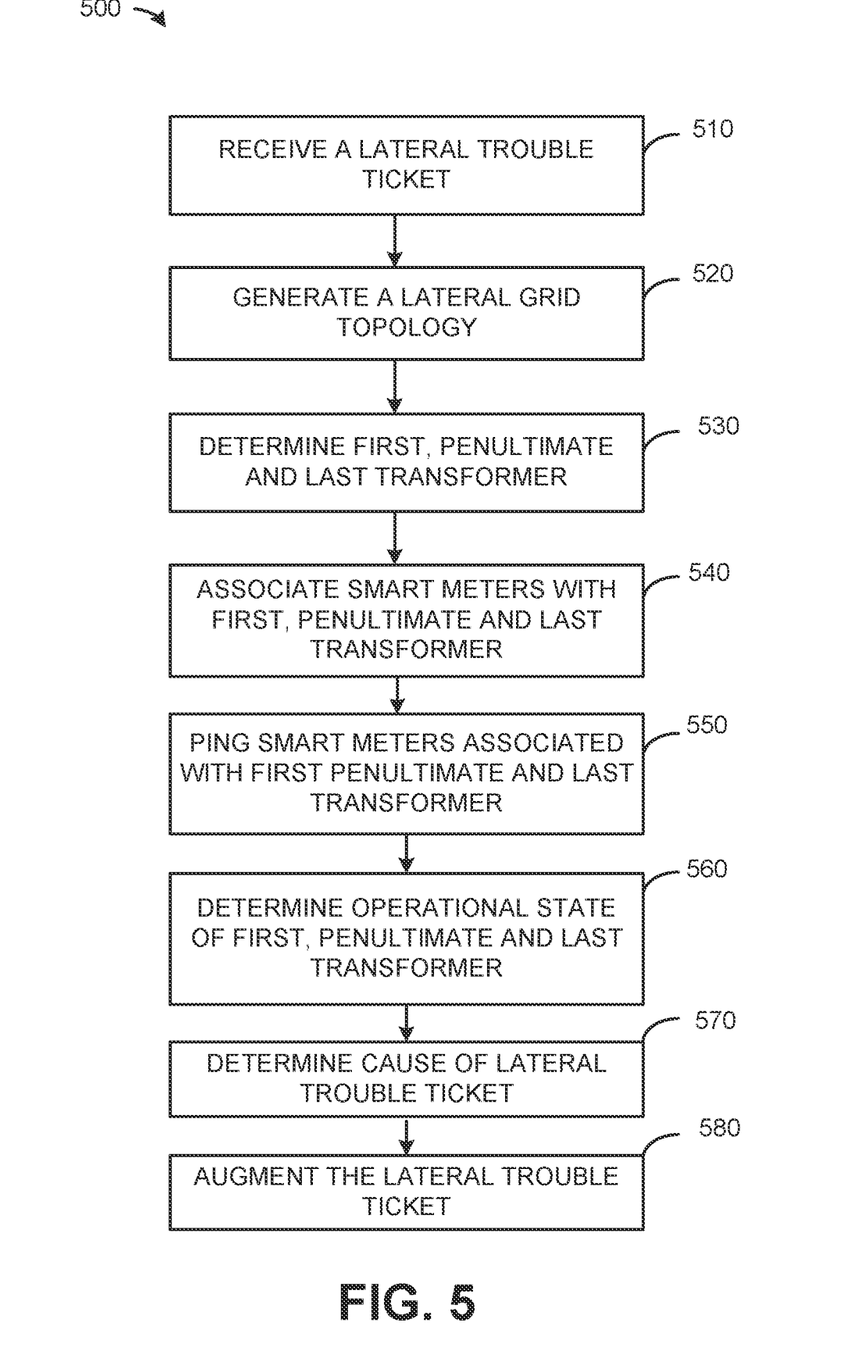
FIG. 5 illustrates an example for automatically processing and augmenting a lateral trouble ticket.

In view of the foregoing structural and functional features described above, an example method will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 5 illustrates a flowchart of an example method 500 for automatically processing and augmenting a lateral trouble ticket (e.g., the lateral trouble ticket 120 of FIG. 1). The method 500 could be implemented, for example, by a cloud computing platform, such as the computing platform 104 illustrated in FIG. 1 and/or the power grid monitoring server 369 of FIG. 3.

At 510, a notification engine (e.g., the notification engine 124 of FIG. 1) can receive a lateral trouble ticket (e.g., the lateral trouble ticket 120 of FIG. 1) from a ticket management engine (e.g., the ticket management engine 128 of FIG. 1). As previously stated, the notification engine can receive the lateral trouble ticket in response to the ticket management engine generating the lateral trouble ticket. At 520, information included in the lateral trouble ticket that characterizes a given lateral and downstream transformers can be employed by a grid topology engine (e.g., the grid topology engine 132 of FIG. 1) to generate a lateral grid topology. Particularly, the grid topology engine can reformat a parent-child hierarchical relationship (e.g., the parent-child hierarchical relationship 200 of FIG. 2A) between the given lateral and downstream transformers to a linear hierarchical relationship (e.g., the linear hierarchical relationship 250 of FIG. 2B), such that the linear hierarchical relationship is incorporated into the lateral grid topology.

At 530, a transformer management engine (e.g., the transformer management engine 144 of FIG. 1) can employ the lateral grid topology to determine a first, penultimate and last transformer downstream from the given lateral. At 540, the transformer management engine can select and associate a set of smart meters with the first, penultimate and last transformers downstream from the given lateral. The set of smart meters can include a first smart meter associated with the first transformer downstream from the given lateral, a penultimate smart meter downstream from the penultimate transformer and a last smart meter downstream from the last transformer.

At 550, the transformer management engine can provide a request to a smart meter management to ping the set of smart meters associated with the first, penultimate and last transformers. Accordingly, at 560, the results of the pings to the smart meters are received by an event processing engine (e.g., the event processing engine 156 of FIG. 1) to determine a state of the first, penultimate and last transformers. At 570, the state of the first, penultimate and last transformers is used to determine a cause of the lateral trouble ticket received at 510. Further, at 580, the ticket management engine can augment the lateral trouble ticket received at 510 to indicate the cause of the lateral trouble ticket, such that the lateral trouble ticket can identify the appropriate service crew to remedy the lateral trouble ticket. Alternatively, the ticket management engine can augment the lateral trouble ticket to indicate that no service crew is required if the event processing engine determines that the cause of the lateral trouble ticket is no problem (e.g., ping results 410 of FIG. 4A).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed:

1. A power grid monitoring system operating on a computing platform comprising:
    a transformer management engine that:
        associates a first smart meter of a set of smart meters with a first transformer downstream from a given lateral, associates a penultimate smart meter of the set of smart meters with a penultimate transformer downstream from the given lateral and associates a last smart meter of the set of smart meters with a last transformer downstream from the given lateral, wherein the first, second and third smart meters are of a set of selected smart meters that is a proper subset of the set of smart meters; and
        pings each smart meter in the set of selected smart meters to determine a state of the first transformer, the penultimate transformer and the last transformer of the given lateral;
    an event processing engine that determines a cause of a lateral trouble ticket associated with the given lateral based on results of the pings to the set of selected smart meters associated with the first, last and penultimate transformers, wherein if the results of the pings to the set of selected smart meters indicate that the first transformer is online and that the last and penultimate transformers are offline, the event processing engine determines that the cause of the lateral trouble ticket is a wire down, and if the results of the pings to the set of selected smart meters indicating that the first, last and penultimate transformer are offline, the event processing engine determines that the cause of the lateral trouble ticket is blown fuse; and
    a ticket management engine that augments the lateral trouble ticket with information characterizing the cause of the lateral trouble ticket.

2. The power grid monitoring system of claim 1, wherein if the results of the pings to the set of selected smart meters indicate that the state of penultimate transformer is different than the state of the first and last transformers, the event processing engine determines that the cause of the lateral trouble ticket is a misattributed smart meter.

3. The power grid monitoring system of claim 2, wherein if the results of the pings to the set of selected smart meters indicate that the state of the penultimate transformer is online and the first and last transformers are offline, the event processing engine determines that the penultimate smart meter is misattributed to the given lateral, such that the state of the penultimate transformer is actually offline and the determined cause of the lateral trouble ticket is a blown fuse.

4. The power grid monitoring system of claim 2, wherein if the results of the pings to the set of selected smart meters indicate that the state of the penultimate transformer is offline and the first and last transformers are online, the event processing engine determines that the last smart meter is misattributed to the given lateral, such that the state of the last transformer is actually offline and the determined cause of the lateral trouble ticket is a wire down.

5. The power grid monitoring system of claim 2, wherein if the results of the pings to the set of selected smart meters indicate that the state of the penultimate transformer is offline and the first and last transformers are online, the event processing engine determines that the penultimate smart meter is misattributed to the given lateral, such that the state of the penultimate transformer is actually online and the determined cause of the lateral trouble ticket is an erroneous elevation of a transformer trouble ticket to the lateral trouble ticket.

6. The power grid monitoring system of claim 5, wherein the ticket management engine augments the lateral trouble ticket to indicate a service a crew is not required to remedy the lateral trouble ticket.

7. The power grid monitoring system of claim 1, wherein the power grid monitoring system further comprises a grid topology engine that generates a lateral grid topology of the plurality of transformers downstream from the given lateral using location data provided by a geographic and information system (GIS).

8. The power grid monitoring system of claim 7, wherein the grid topology engine generates the lateral grid topology in response to the power grid monitoring system receiving a lateral trouble ticket corresponding to the given lateral.

9. The power grid monitoring system of claim 7, wherein generating the lateral grid topology comprises:
  reformatting a parent-child hierarchical relationship between the given lateral and the plurality of transformers downstream from the given lateral to a linear hierarchical relationship between each of the plurality of transformers downstream from the lateral, such that the lateral grid topology arranges the plurality of transformers downstream from the lateral in series; and
  employing the location data provided by the GIS to accurately determine the linear hierarchical relationship between each of the plurality of transformers downstream from the lateral.

10. The power grid monitoring system of claim 9, wherein the transformer management engine associates the set of smart meters with the first, penultimate and last transformer based on the lateral grid topology.

11. The power grid monitoring system of claim 1, wherein the ticket management engine augments the lateral trouble ticket to indicate a service crew capable of servicing a wire down in response to the event processing engine determining that the cause of the lateral trouble ticket is a wire down.

12. The power grid monitoring system of claim 1, wherein the ticket management engine augments the lateral trouble ticket to indicate a service crew capable of servicing a blown fuse in response to the event processing engine determining that the cause of the lateral trouble ticket is a blown fuse, wherein the service crew capable of servicing a blown fuse is incapable of servicing a wire down.

13. A non-transitory computer readable medium, comprising:
  a notification engine configured to receive a lateral trouble ticket in response to a ticket management engine elevating a given trouble ticket to the lateral trouble ticket;
  a grid topology engine that generates a lateral grid topology of a plurality of transformers downstream from a given lateral associated with the lateral trouble ticket using location data provided by a geographic and information system (GIS);
  a transformer management engine that:
    associates a first smart meter of a set of smart meters with a first transformer downstream from the given lateral, associates a penultimate smart meter of the set of smart meters with a penultimate transformer downstream from the given lateral and associates a last smart meter of the set of smart meters with a last transformer downstream from the given lateral based on the lateral grid topology, wherein the first, second and third smart meters are of a set of selected smart meters that is a proper subset of the set of smart meters; and
    pings each smart meter in the set of selected smart meters to indicate a state of the first transformer, the penultimate transformer and the last transformer of the given lateral;
  an event processing engine that determines a cause of the lateral trouble ticket based on results of the pings to the set of smart meters associated with the first, last and penultimate transformers of the lateral grid topology, wherein if the results of the pings to the set of selected smart meters indicate that the first transformer is online and that the last and penultimate transformers are offline, the event processing engine determines that the cause of the lateral trouble ticket is a wire down, and if the results of the pings to the set of selected smart meters indicate that the first, last and penultimate transformer are offline, the event processing engine determines that the cause of the lateral trouble ticket is blown fuse; and
  a ticket management engine that augments the lateral trouble ticket with information characterizing the cause of the lateral trouble ticket.

14. The medium of claim 13, wherein generating the lateral grid topology comprises:
  reformatting a parent-child hierarchical relationship between the given lateral and the plurality of transformers downstream from the given lateral into a linear hierarchical relationship between each of the plurality of transformers downstream from the lateral, such that the lateral grid topology arranges the plurality of transformers downstream from the lateral in series; and
  employing the location data provided by the GIS to accurately determine the linear hierarchical relationship between each of the plurality of transformers downstream from the lateral.

15. The medium of claim 13, wherein the ticket management engine augments the lateral trouble ticket to indicate a service crew capable of servicing a wire down in response to the event processing engine determining that the cause of the lateral trouble ticket is a wire down.

16. The medium of claim 13, wherein the ticket management engine augments the lateral trouble ticket to indicate a service crew capable of servicing a blown fuse in response to the event processing engine determining that the cause of the lateral trouble ticket is a blown fuse, wherein the service crew capable of servicing a blown fuse is incapable of servicing a wire down.

17. A method for monitoring a power grid, the method comprising:
  receiving, by a notification engine, a lateral trouble ticket in response to a ticket management engine elevating a given trouble ticket to a lateral trouble ticket;
  generating, by a grid topology engine, a lateral grid topology using location data provided by a geographic information system (GIS);
  associating, by a transformer management engine, a first smart meter of a set of smart meters with a first transformer downstream from a given lateral, associating a penultimate smart meter of the set of smart meters with a penultimate transformer downstream from the given lateral and associating a last smart meter of the set of smart meters with a last transformer downstream from the given lateral based on the lateral grid topology, wherein the first, second and third smart meters are of a set of selected smart meters that is a proper subset of the set of smart meters;
  pinging, by a smart meter management engine, each smart meter in the set of selected smart meters to indicate a state of the first transformer, the penultimate transformer and the last transformer of the given lateral;

determining, by an event processing engine, a cause of the lateral trouble ticket based on results of the pings to the set of selected smart meters associated with the first, last and penultimate transformers of the lateral grid topology, wherein if the results of the pings to the set of selected smart meters indicate that the first transformer is online and that the last and penultimate transformers are offline, the event processing engine determines that cause of the lateral trouble ticket is a wire down, and if the results of the pings to the set of selected smart meters indicate that the first, last and penultimate transformer are offline, the event processing engine determines that cause of the lateral trouble ticket is blown fuse; and augmenting, by the ticket management engine, the lateral trouble ticket with information characterizing the cause of the lateral trouble ticket.

18. The method of claim 17, wherein generating the lateral grid topology comprises:

reformatting, by the grid topology engine, a parent-child hierarchical relationship between the given lateral and the plurality of transformers downstream from the given lateral into a linear hierarchical relationship between each of the plurality of transformers downstream from the lateral, such that the lateral grid topology arranges the plurality of transformers downstream from the lateral in series; and employing, by the grid topology engine, the location data provided by the GIS to accurately determine the linear hierarchical relationship between each of the plurality of transformers downstream from the lateral.

19. The method of claim 17, further comprising, augmenting, by the ticket management engine, the lateral trouble ticket to indicate a service crew capable of servicing a wire down in response to the event processing engine determining that the cause of the lateral trouble ticket is a wire down.

20. The method of claim 17, further comprising, augmenting, by the ticket management engine, the lateral trouble ticket to indicate a service crew capable of servicing a blown fuse in response to the event processing engine determining that the cause of the lateral trouble ticket is a blown fuse, wherein the service crew capable of servicing a blown fuse is incapable of servicing a wire down.

* * * * *